US009044892B2

(12) United States Patent
Hirdina

(10) Patent No.: US 9,044,892 B2
(45) Date of Patent: *Jun. 2, 2015

(54) PROCESS AND DEVICE FOR THE MANUFACTURE OF A PARTICULARLY HEAT-RESISTANT HOLLOW BODY

(75) Inventor: Jochen Hirdina, Regensburg (DE)

(73) Assignee: KRONES AG, Neutraubling (DE)

( * ) Notice: Subject to any disclaimer, the term of this patent is extended or adjusted under 35 U.S.C. 154(b) by 395 days.

This patent is subject to a terminal disclaimer.

(21) Appl. No.: 12/978,047

(22) Filed: Dec. 23, 2010

(65) Prior Publication Data

US 2011/0089613 A1    Apr. 21, 2011

Related U.S. Application Data

(63) Continuation of application No. 10/592,821, filed as application No. PCT/EP2005/002399 on Mar. 8, 2005.

(30) Foreign Application Priority Data

Mar. 25, 2004    (DE) .......................... 10 2004 014 653

(51) Int. Cl.
  *B29C 39/02*    (2006.01)
  *B29C 49/78*    (2006.01)
  (Continued)

(52) U.S. Cl.
  CPC ............... *B29C 49/783* (2013.01); *B29C 49/04* (2013.01); *B29C 49/06* (2013.01); *B29C 49/12* (2013.01);
  (Continued)

(58) Field of Classification Search
  USPC ......... 264/520, 528, 531, 532, 529, 533–535, 264/572, 454, 37.31
  See application file for complete search history.

(56) References Cited

U.S. PATENT DOCUMENTS 2,930,079 A * 3/1960 Parfrey .......................... 264/542
3,172,929 A * 3/1965 Santelli .......................... 264/537
(Continued)

FOREIGN PATENT DOCUMENTS

DE    1993 4320    *  7/1999
DE    199 34 320 A1    1/2001
(Continued)

OTHER PUBLICATIONS

Librairie Larousse, "Grand Dictionnaire Encyclopedique Larousse—Tome 9," Ed. vol. 9 (1985).
(Continued)

*Primary Examiner* — Stella Yi
(74) *Attorney, Agent, or Firm* — Marshall, Gerstein & Borun LLP

(57) ABSTRACT

A process and a device for the manufacture of a hollow body, particularly of a heat-resistant hollow body, which is molded out of a heated preform of thermoplastic plastic in a contoured blow mold through the introduction of a first medium into the preform, which medium is stored in a first medium storage unit and is under a pressure (p1) (preblowing phase), and the more or less simultaneous stretching of the hollow body through a stretching rod and the introduction of a second medium in the hollow body, which medium is stored in a second medium storage unit and the pressure of which (p2) is higher than the pressure of the first medium (p1) (final blowing phase), and which is cooled by a third medium, which is medium stored in a third medium storage unit (rinsing phase), whereby the preblowing medium is under a pressure of approximately 2-20 bar, the final blowing medium is under a pressure of approximately 15-45 bar, and the cooling medium is under a pressure of approximately 30-45 bar.

18 Claims, 4 Drawing Sheets

(51) Int. Cl.
    *B29C 49/18* (2006.01)
    *B29C 49/66* (2006.01)
    *B29C 49/04* (2006.01)
    *B29C 49/06* (2006.01)
    *B29C 49/12* (2006.01)
    *B29C 49/36* (2006.01)
    *B29C 49/62* (2006.01)
    *B29C 49/46* (2006.01)
    *B29C 49/58* (2006.01)
    *B29K 27/06* (2006.01)
    *B29K 67/00* (2006.01)
    *B29K 627/06* (2006.01)
    *B29C 49/42* (2006.01)

(52) U.S. Cl.
    CPC ............... *B29C 49/18* (2013.01); *B29C 49/36* (2013.01); *B29C 49/62* (2013.01); *B29C 49/66* (2013.01); *B29C 2049/4608* (2013.01); *B29C 2049/462* (2013.01); *B29C 2049/4655* (2013.01); *B29C 2049/5841* (2013.01); *B29C 2049/6615* (2013.01); *B29C 2049/6646* (2013.01); *B29C 2049/6676* (2013.01); *B29C 2049/6692* (2013.01); *B29K 2027/06* (2013.01); *B29K 2067/00* (2013.01); *B29K 2627/06* (2013.01); *B29K 2995/004* (2013.01); *B29K 2995/0041* (2013.01); *B29C 49/4289* (2013.01)

(56) References Cited

U.S. PATENT DOCUMENTS

| | | | | |
|---|---|---|---|---|
| 3,339,229 A * | 9/1967 | Billings | ............... | 425/525 |
| 3,717,429 A * | 2/1973 | Peters et al. | ............... | 425/536 |
| 3,806,300 A * | 4/1974 | Hafele et al. | ............... | 425/525 |
| 3,819,317 A * | 6/1974 | Higginbotham | ............... | 425/526 |
| 4,043,735 A * | 8/1977 | Farrell | ............... | 425/389 |
| 4,061,705 A * | 12/1977 | Marcus | ............... | 264/513 |
| 4,065,535 A * | 12/1977 | Legrand | ............... | 264/532 |
| 4,066,727 A * | 1/1978 | Reilly et al. | ............... | 264/532 |
| 4,128,383 A * | 12/1978 | Bond et al. | ............... | 425/529 |
| 4,152,383 A * | 5/1979 | Ryder | ............... | 264/39 |
| 4,379,688 A | 4/1983 | Tate et al. | | |
| 4,473,515 A * | 9/1984 | Ryder | ............... | 264/28 |
| 4,488,863 A | 12/1984 | Collette | | |
| 4,883,631 A * | 11/1989 | Ajmera | ............... | 264/528 |
| 5,085,822 A * | 2/1992 | Uehara et al. | ............... | 264/528 |
| 5,182,122 A * | 1/1993 | Uehara et al. | ............... | 425/526 |
| 5,290,506 A * | 3/1994 | Yokobayashi | ............... | 264/520 |
| 5,622,735 A | 4/1997 | Krishnakumar et al. | | |
| 6,428,735 B1 * | 8/2002 | Deemer et al. | ............... | 264/454 |
| 6,514,451 B1 | 2/2003 | Boyd et al. | | |
| 6,855,289 B2 * | 2/2005 | Krishnakumar et al. | ............... | 264/516 |
| 8,052,904 B2 * | 11/2011 | Derrien et al. | ............... | 264/40.3 |
| 2002/0171161 A1 | 11/2002 | Belcher | | |
| 2003/0098526 A1 * | 5/2003 | Krishnakumar et al. | ............... | 264/516 |
| 2004/0173949 A1 | 9/2004 | Storione et al. | | |
| 2007/0290415 A1 * | 12/2007 | Suenaga et al. | ............... | 264/532 |
| 2008/0139717 A1 * | 6/2008 | Brasel et al. | ............... | 524/380 |
| 2011/0024953 A1 * | 2/2011 | Winzinger | ............... | 264/531 |
| 2011/0287197 A1 * | 11/2011 | Britton | ............... | 428/34.1 |

FOREIGN PATENT DOCUMENTS

| | | | |
|---|---|---|---|
| DE | 1993 43201 | * | 1/2001 |
| EP | 0 655 313 A1 | | 5/1995 |
| EP | 0 754 537 A1 | | 1/1997 |
| EP | 0870594 A1 | | 10/1998 |
| EP | 1314535 A1 | | 5/2003 |
| FR | 2 827 541 A1 | | 1/2003 |
| JP | 3-009831 A | | 1/1991 |
| JP | 5-092476 A | | 4/1993 |
| JP | 5-309726 A | | 11/1993 |
| JP | 7-156259 A | | 6/1995 |
| JP | 11-207808 A | | 8/1999 |
| WO | WO-03/009993 A1 | | 2/2003 |

OTHER PUBLICATIONS

English-language translation of Japanese Office Action for Application No. 2007-504285.

International Preliminary Report on Patentability for Application No. PCT/EP2005/002399, dated Nov. 1, 2006.

International Search Report and Written Opinion for Application No. PCT/EP2005/002399, dated Jun. 6, 2005.

German Office Action for Patent Application No. 10 2004 064 192.7 dated Oct. 26, 2012.

German Office Action for Patent Application No. 10 2004 064 191.9 dated Oct. 26, 2012.

German Office Action for Patent Application No. 10 2004 064 193.5 dated Oct. 26, 2012.

* cited by examiner

US 9,044,892 B2

PROCESS AND DEVICE FOR THE MANUFACTURE OF A PARTICULARLY HEAT-RESISTANT HOLLOW BODY

CROSS-REFERENCE TO RELATED APPLICATION

This is a continuation application of U.S. patent application Ser. No. 10/592,821, which is the U.S. national stage application of international application no. PCT/EP2005/002399, having an international filing date of Mar. 8, 2005, and which is based on and claims priority to German application no. 10 2004 014 653.5 filed on Mar. 25, 2004.

FIELD OF THE DISCLOSURE

The disclosure relates to a process for the manufacture of a hollow body, particularly of a heat-resistant hollow body, which is molded from a heated preform of thermoplastic plastic in a contoured blow mold. The disclosure additionally relates to a device by means of which such a process can be carried out.

BACKGROUND OF THE DISCLOSURE

In the food industry and, in particular, in the beverages industry as well, there has been an increasing tendency for some time to fill foods or beverages, as the case may be, into hollow bodies of thermoplastic plastic, particularly bottles of PET. There are various possibilities for extending the shelf life of beverages, such as hot decanting, for example. If it is desired to fill the beverages that are to be filled into plastic containers, such as PET bottles, for example, in a hot condition, then an elevated temperature-resistance of these containers is necessary.

In known processes and devices for the manufacture of heat-resistant hollow bodies, the preforms are preblown with a medium under pressure (preblowing phase) and, in a second step, are blown into finished form with a medium under higher pressure (final blowing phase). The final blowing pressure is high enough that the plastic molded blank is pressed against the wall of the blow mold. This pressure is maintained for a certain time in order to give the contours the shape that is ideal for the bottle being created. If the hollow bodies that are to be manufactured are temperature-resistant hollow bodies (so-called hot-fill bottles), then the wall of the mold against which the bottle being created is pressed in order to mold the contour is heated. The bottle is held against this warm wall in order to subject the plastic to a partial crystallization in order to thereby achieve an elevated thermal and shape stability. In the event of an excessively great crystallization of the plastic, however, an undesirable discoloration of the same, or opalization, is brought about. In order to achieve a sufficient stability of shape of the bottles upon their removal from the mold and to prevent the above-stated discoloration, it is very important to cool these during the process of manufacturing hot-fillable plastic bottles. The cooling can take place in the interior of the bottle, for example. Various media can be used for that purpose. One widely used technique is cooling by means of compressed air. The cooling or rinsing air, as the case may be, is frequently supplied to the bottle through a hollow stretching rod. In order to guarantee a sufficient cooling by means of air circulation, for example, valves are opened in order to produce an air flow, which transports the heat of the internal wall of the bottle away. So-called rinsing air medium thereby flows from the air feed unit, through the bottle and sound absorber, and into the open air. After this cooling phase, the medium still remaining inside in the bottle and under pressure is discharged. This is also generally carried out through the sound absorber. One disadvantage of this process is the very high consumption of air that is brought about, particularly by the cooling or rinsing process, as the case may be.

Summary of the Disclosure

The task which forms the basis of the disclosure, therefore, is that of making available a process for the manufacture of hollow bodies, particularly heat-resistant hollow bodies, in which the consumption of air is considerably lower than that of the known processes. In addition, the task forming the basis of the disclosure is that of making a device available that works in accordance with the process in accordance with the invention.

The process steps are provided for the solution of the task concerning the process. In accordance with these process steps, a medium, preferably compressed air, is first of all introduced into the preform located in the blow mold, which medium is stored in a first medium storage unit under a pressure ($p1$) and deforms the preform (preblowing phase). Other media can, of course, also be used in addition to compressed air. Other aggregate conditions are thereby conceivable, such as vapor or fluid media, for example, as well as other compositions. The most varied gases, such as nitrogen or oxygen, for example, or the most varied mixtures of the same, can be used in addition to air. Steam can be used as a vapor medium, for example. It is also conceivable to carry out the molding process with the most varied fluid media, such as water, for example. The process is not restricted to the use of specific plastic preforms, so that PET preforms, PVC preforms, or others, for example, can be used.

One or more medium storage units can be constructed in the most varied ways. For example, spherical, square, or ring-shaped storage units are conceivable. Other storage unit forms, not stated here, are also possible and are not explicitly excluded.

The preblowing medium is under a pressure ($p1$) of 2 to 20 bar, whereby, in one preferred form of implementation, it is under a pressure of 3 to 10 bar.

The stretching of the preform also begins during this phase of the blowing process through the fact that a stretching rod moves out of the opening of the same and into the direction of its base in order to expand it in its length. The stretching rod can either be molded solid or provided with recesses, or even be entirely hollow, in order to meet the various requirements of the blowing process.

After the hollow body has been preblown, a medium with the pressure ($p2$) is yet again introduced, whereby the pressure ($p2$) is greater than the pressure ($p1$). The hollow body is thereby blown into the finished form and pressed against the inner wall of the blow mold (final blowing phase). The final blowing medium can again be one of the most varied media with the most varied aggregate conditions. The final blowing preferably involves the same medium as upon the preblowing; in one preferred form of implementation, it is compressed air. The final blowing medium is under a pressure ($p2$) of 15 to 45 bar, preferably under a pressure of 20 to 30 bar. In one particularly preferred further development, a final blowing medium under a pressure of 23 to 26 bar is used.

In order to achieve a partial crystallization and, as a result, a stabilization of the glass containers to be manufactured, the internal wall of the blow mold is to be heated during the manufacture of heat-resistant hollow bodies. In order to cool the hollow body which is, because of the final blowing step, lying against the warm inner wall of the blow mold, and in order to thereby prevent an undesirable effect of shrinking back upon removal, a rinsing or a cooling medium, as the case may be, is, in an additional step, introduced from a storage unit into the hollow body under the pressure (p3). The introduction of the cooling medium can be carried out through the blowing nozzle that is placed on the upper end of the containers to be manufactured, or else it can be brought in through a hollow stretching rod. The hollow stretching rod can also be open at the bottom, and this has the advantage that the base of the container can be cooled in a completely targeted manner. This is particularly important, therefore, since—because of the blowing process—more material is present in the base area than in the neck or body area, for example. More material, however, also means more stored heat that must be transported away in order to guarantee the stability of shape of the hollow body upon its removal from the mold. If the cooling air is introduced into the hollow body through the hollow stretching rod, then, in one preferred form of implementation, in addition to the opening that is directed downwardly and laterally, a number of holes are located inside the stretching rod in order to be able to cool specific areas of the inner wall of the container in a completely targeted manner. The cooling medium can also be of the most varied composition and most varied conditions. In one preferred form of implementation, the cooling medium is the same medium as in the pre- and final blowing. It is thereby under a pressure (p3) of 30 to 45 bar, preferably 37 to 45 bar. The cooling or rinsing air medium storage unit, as the case may be, is preferably constructed in the same way as the other storage units.

Since the rinsing air pressure (p3) is greater than the pressure of the final blowing air (p2), the rinsing air does not, in this process, have only the task of cooling the bottle, but also of completely pressing out the contours of the hollow body to be manufactured (pressing out phase). Because the complete molding out of the contour of the hollow body to be manufactured is now no longer carried out only during the final blowing phase, the process time for the final blowing can be shorted by approximately the amount of time that would be provided for the molding out of the contour. At this point of the process, only one connection from a medium storage unit into the hollow body is opened—namely, the one to the cooling medium storage unit. Because of the difference between the pressure (p2) prevailing in the bottle at this point in time and the pressure (p3), the cooling medium can, after the opening of the connection of the rinsing and cooling air medium storage unit with the hollow body, flow into this but, in any event, only for long enough until the pressure in the hollow body is equal to the pressure in the rinsing and cooling air medium storage unit. Because of this limited flowing of cooling medium into the hollow body, the cooling of the same is not yet concluded at this point in time of the process. If the pressure in the hollow body is equal to the pressure in the cooling and rinsing medium storage unit, then this condition is to be maintained for a certain time in order to support the stated molding of the contour of the bottle and the crystallization on the container wall.

After this molding out phase, the cooling of the bottle is further continued due to the fact that a connection of the bottle to a medium storage unit with a lower pressure than that of the rinsing air is produced, while the connection of the bottle with the rinsing and cooling air medium storage unit remains open. Because of that, rinsing air flows through the bottle into the medium storage unit at a lower pressure, and the bottle is cooled, through the movement of air, from the inside. The cooling air thereby absorbs the heat, and transports this into the medium storage unit with the lower pressure. In contrast to the known processes, the rinsing of the bottle in the process in accordance with the disclosure is therefore not carried out against the surrounding environment but, rather, against another medium storage unit. Since an overpressure is already prevailing in this, the through-flow of rinsing air is reduced, in contrast to the rinsing against the surrounding environment. This is compensated for by a lengthening of the rinsing time. Due to the fact that the process time was reduced in the final blowing, the entire blowing process does not need to be extended, even despite the lengthening of the rinsing time. The medium storage unit against which rinsing is carried out is therefore supplied through the bottle from the rinsing and cooling air medium storage unit, and consequently no longer needs its own process of air supply. Because the rinsing air in the process in accordance with the disclosure is the medium that has the highest pressure, rinsing can be carried out against any other medium storage unit of the blowing process. Since the pressures prevailing in the specific medium storage units are different, however, the rinsing or cooling times must be adjusted and set on the basis of the different pressure differences and the different pressure compensation times resulting from the same.

At the end of the cooling phase, the through-flow of rinsing air described is stopped again and the remaining compressed air still located inside the bottle is let out, so that essentially the conditions of the ambient atmosphere prevail in it. The letting out of this residual air can be carried out both against the surrounding environment, as well as against another medium storage unit.

At least one of the media is preferably compressed air. In one preferred form of implementation, the type of the medium is not changed in any process step. It is thereby possible to transfer the media back and forth between the different storage units without thereby bringing about an undesirable mixture. Only the pressures have to be kept at an essentially constant level.

In one of these advantageous further developments, the medium storage units are provided with pressure compensation devices, such as pressure compensation tanks, for example, in order to keep the pressure in the medium storage units as uniform as possible. This is particularly appropriate, since connections between medium storage units with different pressure levels are produced, whereby the theoretical pressures in the storage units should be changed as little as possible. Different pressure compensation devices are conceivable, but they should all be designed in such a manner, however, that the pressure changes in the medium storage units do not exceed ten percent of the theoretical value.

Rather than using pressure compensation devices, however, it is also conceivable to instead connect the blowing station throttle valves in series, which valves regulate the pressure which, in this case, must always be supplied at a higher pressure than what is finally required for the specific process steps.

In one other advantageous further development of the disclosure, the medium that is still located in the bottle after the cooling phase is not discharged into the surrounding environment, but is instead transferred to a medium storage unit. The control air medium storage unit could be supplied by that means, for example. In one preferred further development, the medium storage unit is not a medium storage unit that is already available, but is instead an additional, fourth medium storage unit, preferably a low pressure medium storage unit. Such a low pressure medium storage unit could be the compressed air network of a factory through which compressed air pistols are supplied, for example. The recycling rate of the blowing medium is further improved by such a transfer.

Consequently, the device in accordance with the disclosure comprises a contoured blow mold in which the preform or the bottle is located during the blowing process, a stretching rod with the help of which the preform is stretched along its longitudinal axis, and at least three medium storage units in which the process media of the blowing process are located. The preblowing medium is thereby under a pressure of 2 to 20 bar, preferably 3 to 10 bar. The final blowing medium is under a pressure of 15 to 45 bar, preferably 23 to 26 bar, and the rinsing medium is under a pressure of 30 to 45 bar, preferably 37 to 40 bar.

The machine is preferably a rotational stretch blowing machine. It is, however, also conceivable to use this process in another stretch blowing machine or in another type of machine, such as in an extrusion blowing machine, for example.

In one preferred further development, compressed air is used as a process medium in at least in one step. Compressed air is preferably used during every process step. As has already been mentioned in connection with the process, it is also conceivable to use any media in different aggregate conditions. In one preferred further development, there is a central air feed unit for the machine, which transfers the process air from the stationary part into the rotating part of the machine.

The medium storage units can be constructed in the most varied ways and manners. Spherical or square medium storage units are conceivable, for example. In one preferred form of implementation, the storage unit has channels that essentially form a ring which consists of two sealed semicircles. The semi-circles thereby have a cross-section that corresponds approximately to a square.

In accordance with one other preferred further development, pressure compensation devices are attached to the circular channels in order to keep the pressures in the channels nearly uniform. Uniform pressure is extremely important for the quality of manufactured products.

In accordance with one preferred further development, the rinsing or the cooling air, as the case may be, is introduced into the hollow body through a hollow stretching rod. Holes, through which the cooling air can flow onto specific points of the internal wall of the bottles in a targeted manner, are thereby provided in the stretching rod, preferably at both the lower end and at the lateral end.

In accordance with one other preferred further development, the machine has six circular channel storage units that accommodate the media for the pre- and final blowing, for the cooling of the hollow body and the control of the machine, and for the control of the stretching rod (up and down).

BRIEF DESCRIPTION OF THE DRAWINGS

One example of implementation of the disclosure is described in the following by means of the diagrams. These depict the following.

DETAILED DESCRIPTION OF THE DISCLOSURE

Figure 1:
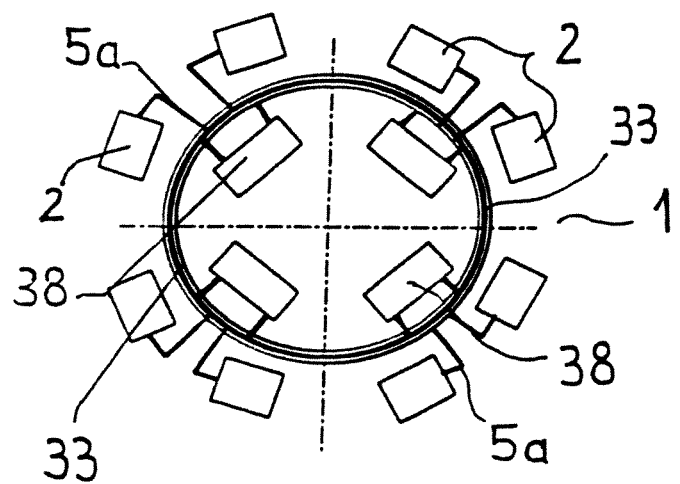
FIG. 1: A schematic view from above of the blowing wheel of a rotational stretch blowing machine.

The device in accordance with FIG. 1 is designed for the manufacture of heat-resistant hollow bodies (7) of PET for the beverage industry in the form of bottles. It essentially comprises a certain number of blowing stations (2) in which the hollow bodies (7) are embedded in a blow mold (2a), and are acted on with overpressure and consequently formed into the bottle. It comprises, in addition, one primary blowing air line (5a) for each blowing station (2), which line is connected with a rinsing and cooling air medium storage unit (33). Pressure compensation tanks (38), the task of which is to keep the pressure levels of the medium storage unit (31-36) as uniform as possible, are located in the interior of the blowing wheel. In the device in accordance with FIG. 1, the medium storage units (31-36) are constructed as circular channels.

The course of the process of the present concrete form of implementation of the disclosure is described by means of the FIGS. (2-4) as follows: There is a central process medium supply unit (5) which brings the process medium that is under application pressure from the stationary part, through the rotating distributor (70), and into the rotating part of the machine. Compressed air, which is under a pressure of 40 bar upon introduction into the rotating part of the machine, is used for every partial process here. This air is fed into the rinsing and cooling air medium storage unit (33) until it has been filled. From the central process medium supply unit (5), there is a connection (5b) to the final blowing medium storage unit (31), which is controlled by an automatic non-return valve (57). If the pressure in the final blowing medium storage unit (31) drops by approximately ten percent of its theoretical value during the operation of the machine, then the automatic non-return valve (57) opens and the final blowing medium storage unit (31) is supplied by the process medium supply (5) through the connection (5b) for long enough for the pressure in the final blowing medium storage unit (31) to again lie at a maximum of ten percent below the theoretical value. This case is applicable, for example, during the starting of the machine, if overpressures have still not yet been built up in the medium storage units (31-36). The final blowing medium storage unit (31) is thereby already supplied with process air before the manufacturing operation. By means of the automatic non-return valves (58, 59a, 59b) and the connection (5g, 5h and 5i), compressed air is supplied through the final blowing medium storage unit (31), the control air medium storage unit (34), the "stretching up" medium storage unit (35), and the "stretching down" medium storage unit (36). The automatic non-return valve (58) is thereby set to a value of approximately 10 bar, in order to be able to adjust this pressure in the control air medium storage unit. The "stretching up" medium storage unit (35) and the "stretching down" medium storage unit (36) are filled with process air, which is under a pressure of approximately 6 bar. The automatic non-return valves (59a and 59b) therefore only need to be set to approximately 6 bar.

The preblowing medium storage unit (32), which supplies the process air for the preblowing, is also supplied through the automatic non-return valve (56) and the connection (5e). Since the preblowing pressure amounts to approximately 5 bar, the automatic non-return valve (56) is also set to approximately this pressure.

Figure 2:
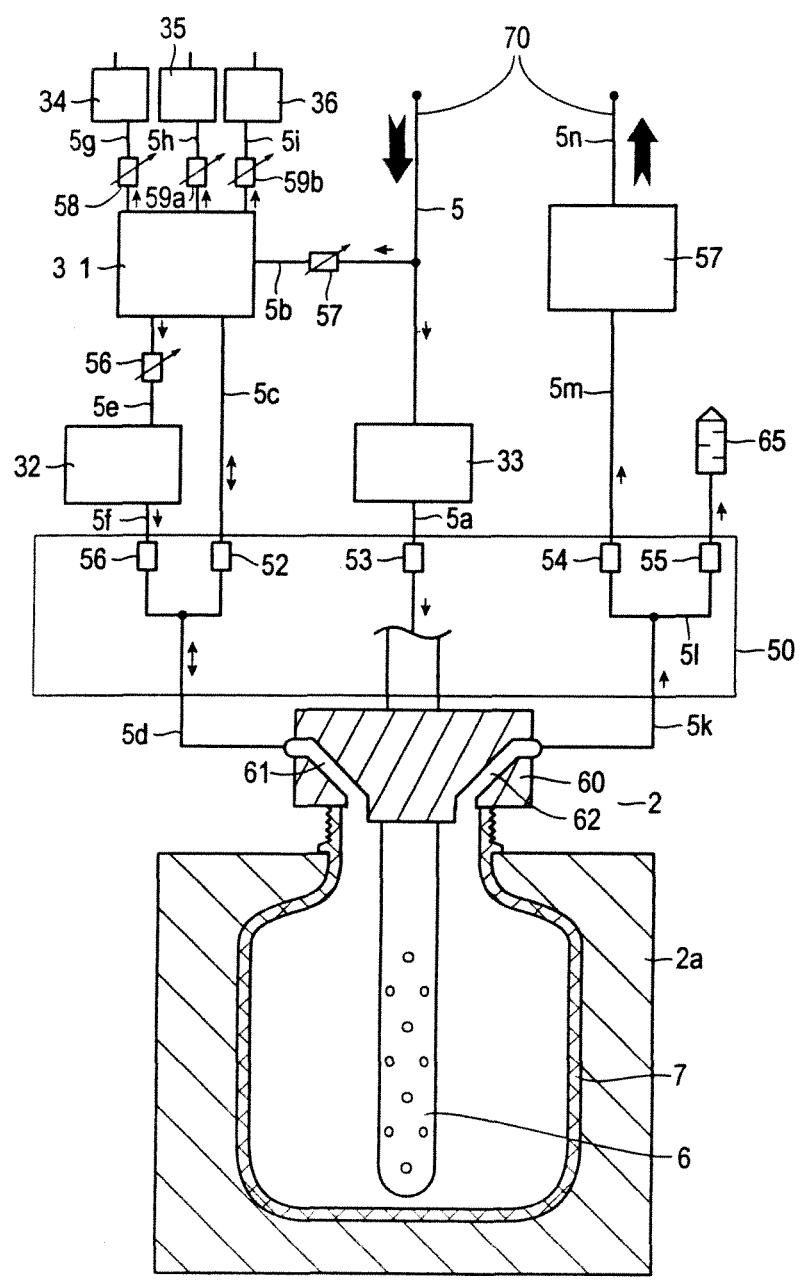
FIG. 2: A schematic view of the blowing station and of the process medium supply.

FIG. 2 additionally depicts the blowing station (2). This consists of the valve block (50), the blowing nozzle (60), the blow mold (2a), and the hollow stretching rod (6). The valve block (60), for its part, consists of the valves (51-55) that control the inflow or the outflow of the process air, as the case may be. The glass nozzle (60) rests on the hollow body (7), and is connected with the valve block (50) through the connections (5d and 5k). The hollow stretching rod (6), which is moved, during the operation of the machine, within the closed form (2a) and the hollow body to be blown (7), is connected with the rinsing and cooling air medium storage unit (33) through the primary blowing air line (5*a*).

If the medium storage units (31-36) are all filled, then the actual process for manufacturing the hollow bodies (7) can be started.

First of all, the hollow body that is to be blown (7) is introduced into the form (2*a*), which is then closed. After the blowing nozzle (60) has been placed on the hollow body (7), the hollow stretching rod (6) can penetrate into this from above, in order to expand it in its length. The valve (51) in the valve block (50) is immediately opened (see FIG. 3, point 81), in order to conduct preblowing air, under a pressure of approximately 5 bar, through the connection (5*f* and 5*d*) and into the feed unit (61) of the blowing nozzle (60) and, as the result, into the hollow body (7). This is now also radially expanded in the direction of the wall of the blowing mold. If the preblowing is ended, then the valve (51) closes again and the final blowing valve (52) is opened (see FIG. 3, point 82). The final blowing air, which is under a pressure of approximately 30 bar, thereby flows from the final blowing medium storage unit (31), through the connection (5*c*, 5*d*) and the air circulation unit (61) of the glass nozzle (60), and into the hollow body (7). If the pressure in the hollow body (7), which is now almost completed, is built up, then the final blowing phase is ended, and the final blowing valve (52) is closed again. At this point in time of the process, the hollow body has, to be sure, already essentially reached its definitive external form, but the contours have not yet been expanded completely outwardly, however. The molding out phase, which begins with the opening (see FIG. 3, point 83) of the rinsing and cooling air valve (53), serves that purpose. The cold rinsing air, which is under a pressure of approximately 40 bar, thereby flows out from the rinsing and cooling air medium storage unit (33), through the connection (5*a*) and the hollow stretching rod (6), and into the hollow body (7). After the pressure in the hollow body (7) has built up (see FIG. 3, point 83*a*), it is kept at this level for some more time in order to expand it out completely. Through the difference of temperature between the rinsing air and the internal wall of the bottle, the rinsing air is heated slightly, and the internal wall of the bottle becomes somewhat cooler. If the hollow body (7) were to be already removed from the blow mold (2*a*) at this point in time, then it would be very unstable because of the residual heat that it still contains. For this reason, it must be cooled further. For that purpose (see FIG. 3, point 83*b*), the final blowing valve (52)—with the rinsing and cooling air valve (53) still open—is opened yet again. The somewhat heated rinsing air located inside the hollow body (7) can thereby flow through the air circulation unit (61) in the blowing nozzle (60) and the connection (5*d* and 5*c*), and then back into the final blowing medium storage unit (31). This condition is also maintained for some time in order, on the one hand, to produce the necessary air circulation in the hollow body (7) in order to cool it and, on the other hand, in order to supply the final blowing medium storage unit (31) with process air, in order for enough compressed air to thereby be available for the next blowing step. During this process step, a pressure of approximately 30 bar builds up in the hollow body (7) because of the pressure compensation (see FIG. 3, point 83*c*). If this cooling and rinsing phase, which simultaneously serves as the air recycling phase, ends, then the final blowing valve (52) and the rinsing and cooling air valve (53) are closed, while the discharge valve (55) is opened at the same time (see FIG. 3, point 84), so that the process air located inside the hollow body (7) can flow, through the air circulation unit (62), the blowing nozzle (60), the connection (5*k*), and the connection (51), and into the sound absorber (65) (discharge phase). Essentially ambient conditions thereby prevail in the hollow body (7) after the opening of the discharge valve (55).

The discharge after the rinsing and cooling or recycling phase, as the case may be, cannot only be carried out against the sound absorber (65), however, but also against the operating air medium storage unit (37). For that purpose, the operating air valve (54) is opened simultaneously with the closing of the final blowing valve (52) and of the rinsing and cooling air valve (53) (see FIG. 3, point 84), so that the air in the hollow body (7), which has a pressure of approximately 30 bar, can flow through the air circulation unit (62), the blowing nozzle (60) and the connection (5*k* and 5*m*), and into the operating air medium storage unit (37). From there, it is possible to feed the air through the connection (5*n*) and the rotating distributor (70) from the rotating part of the machine into a stationary part, in order to thereby supply other processes taking place in the environment of the machine with process air. In the form of implementation depicted, the operating air medium storage unit (37) is located in the rotating part of the machine. It is just as possible, however, to accommodate this in the stationary part, or even outside the machine. In this case, the air would be conducted, during the discharge phase, through the connection (5*m*) or (5*n*), respectively, immediately into the rotating distributor (70) of the machine, and thereby into the stationary part.

If the process air, as just now described, is not immediately discharged through the sound absorber (65), but is instead conducted out of the machine through the operating air medium storage unit (37), then this only occurs at the pressure level that prevails in the operating air medium storage unit (37). The remaining air located in the hollow body (7) is not recaptured, but is instead conducted through the air circulation unit (62) in the blowing nozzle (60), the connections (5*k* and 51), and through the sound absorber (65), and out into the open air. After the pressures in the hollow body (7) and in the operating air medium storage unit (37) have been adjusted, the operating air valve (54) is thereby closed and the discharge valve (55) is opened.

The valves in the valve block (50) can be designed differently in order to increase the through-flow of process air, and thereby the performance of the machine as well. The maximum possible throughput of air through a valve is either increased by expanding the cross-section, or else several valves are placed on one switching point. Thus, for example, two discharge valves (55 and 55') could be used in the discharge, rather than just the one discharge valve (55).

Figure 3:
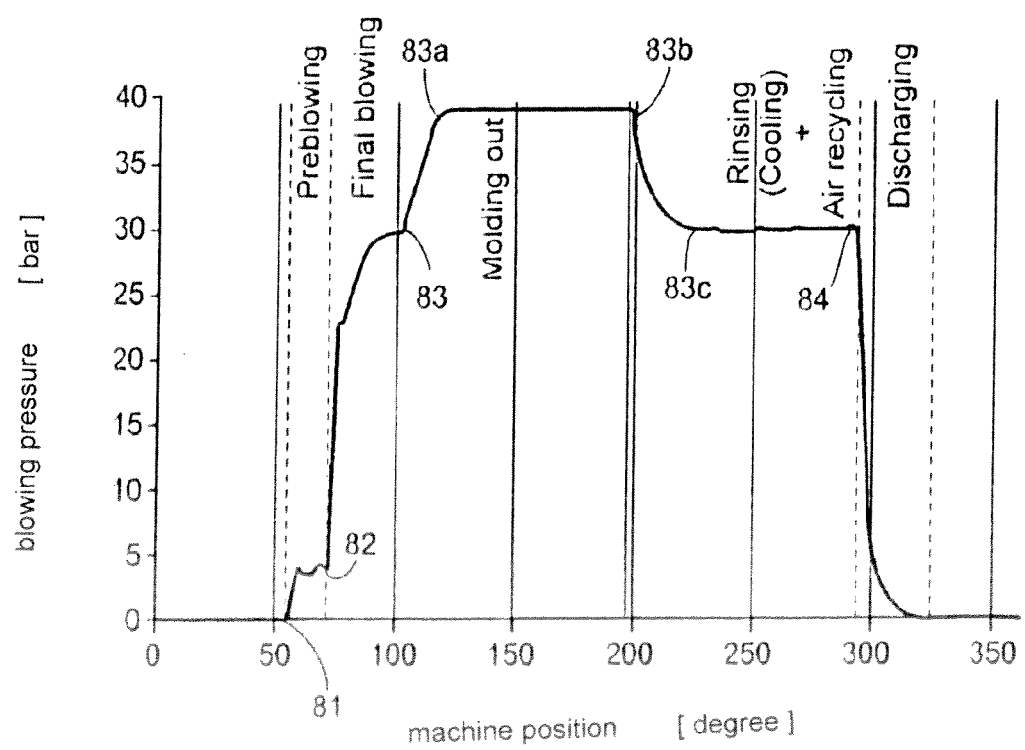
FIG. 3: A process curve of the process in accordance with the disclosure for manufacturing heat-resistant hollow bodies.
Figure 4:
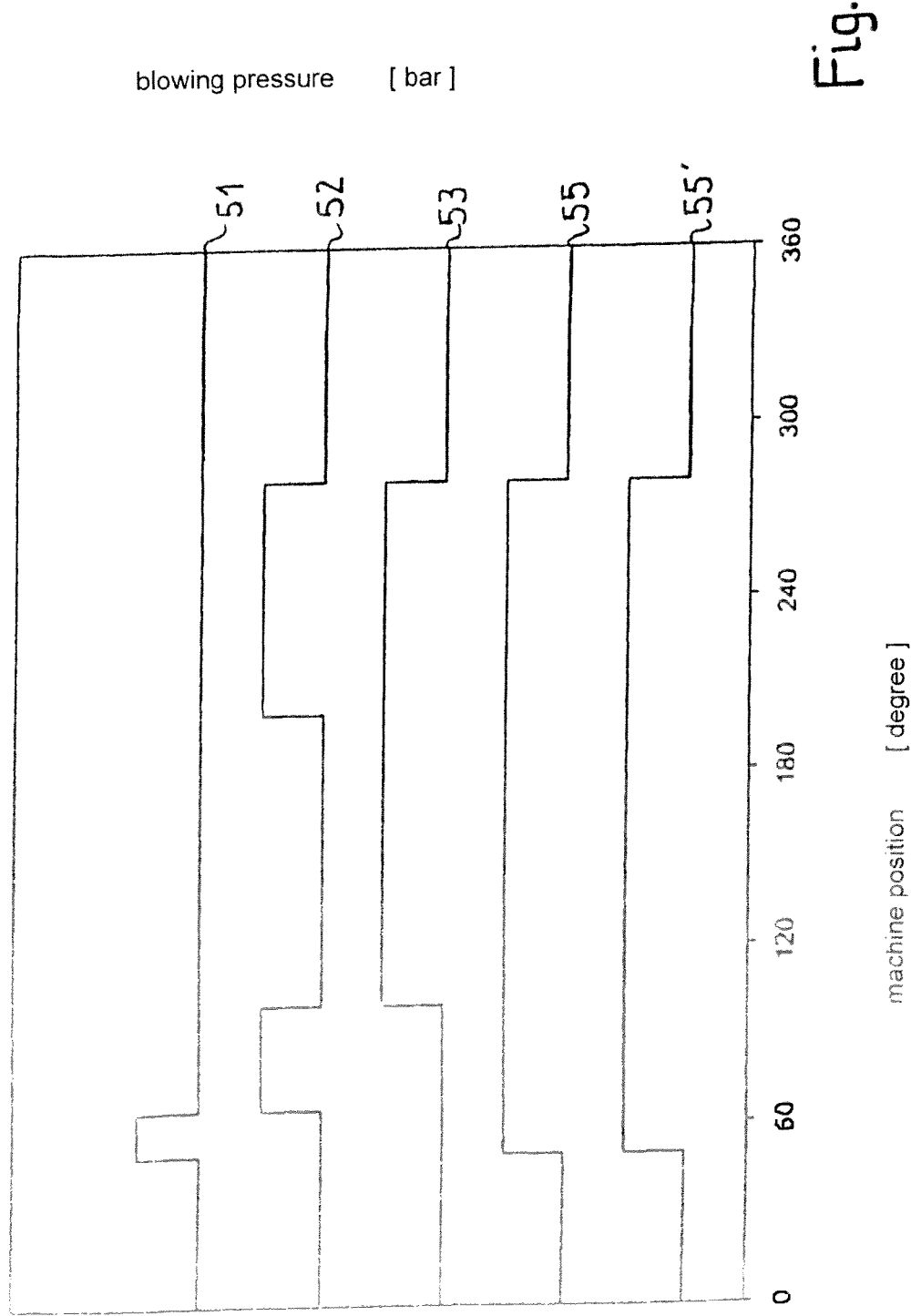
FIG. 4: Valve switch points in the manufacturing process in accordance with the disclosure.

FIG. 3 and FIG. 4 depict a process curve, which shows the blowing pressure in bar in relation to the machine position in degrees, and a wiring connection of the valves (51-55') in relation to the machine position in degrees.

At the beginning of the process (machine position 0°), the preblowing valve (51), the final blowing valve (52), and the rinsing and cooling air valve (53) are closed, and the discharge valves (55 and 55') are opened. After a certain time (t), the preblowing process is started through the opening of the preblowing valve (51) (machine position [54°]). Preblowing air at approximately 5 bar is thereby transferred from the preblowing medium storage unit (32) and into the hollow body (7). The discharge valves (55 and 55') are also closed, more or less simultaneously. After the preblowing process has ended, the preblowing valve (51) closes again, and the final blowing valve (52) opens (machine position 64°). After the closing of the final blowing valve (52), the rinsing and cooling air valve (53) is opened (machine position 100°).

If the hollow body (7) is finally expanded out, then the final blowing valve (52) is opened yet again (see FIG. 3, point 83*b*), as the result of which compressed air can now flow from the rinsing and cooling air medium storage unit (33), through the blowing station (2), and into the final blowing medium storage unit (31) (machine position 197°). At this point in time of the process, the final blowing valve (52) and the rinsing and cooling air valve (53) are also opened. If the bottle that has been blown into finished form has been sufficiently cooled, then the final blowing valve (52) and the rinsing and cooling air valves (53) are closed, and the discharge valves (55 and 55') are opened (see FIG. 3, point 84), through which the compressed air, which is located in the bottle and is acted on with approx. 30 bar, escapes through the discharge valves (55, 55') and the sound absorber (65), and into the surrounding environment, so that essentially ambient conditions thereby prevail in the hollow body (7) (machine position 292°). The remaining process time (68° of the machine rotation), up until a new hollow body that has yet to be blown (7) is yet again introduced into the blow mold (2a), is needed for the discharge of the bottle blown in finished form and for the opening of the blow mold (2a).

I claim:

1. A process for manufacturing a hollow body which is molded from a heated preform of thermoplastic material in a contoured blow mold, comprising stretching a preform by moving a hollow stretching rod through an opening of the preform and into a direction of its base, placing a blowing nozzle on the hollow body, and connecting the blowing nozzle with a valve block comprising a preblowing valve and a final blowing valve, and further comprising a subsequent opening of the preblowing valve and conducting preblowing air through the preblowing valve into the hollow body; closing the preblowing valve, opening the final blowing valve and conducting final blowing medium through the opened final blowing valve into the hollow body; closing the final blowing valve and cooling the hollow body by feeding a cooling medium through the hollow stretching rod, the hollow stretching rod having an open bottom directed downwardly and cooling the hollow body comprising cooling the base of the hollow body in a completely targeted manner by the cooling medium fed through the open bottom, and removing the cooling medium from the hollow body by means of the blowing nozzle thereby enabling circulation of the cooling medium during the cooling process.

2. A process according to claim 1, wherein the cooling medium completely presses out the contours of the hollow body to be produced.

3. A process according to claim 1, wherein, through holes formed laterally in the stretching rod, the cooling medium cools specific areas of the inner wall of the hollow body in a targeted manner.

4. A process according to claim 1, wherein the cooling medium is under a pressure in a range of approximately 30 bar to approximately 45 bar.

5. A process according to claim 1, wherein the cooling medium is under a pressure in a range of approximately 37 bar to approximately 45 bar.

6. A process according to claim 1, wherein the cooling of the hollow body comprises establishing a connection between the hollow body and a medium storage unit at a pressure that is lower than a pressure of the cooling medium, while the connection between the hollow body and the medium storage unit remains open.

7. A process according to claim 6, wherein cooling of the hollow body is executed at a pressure that is lower than a pressure of the cooling medium.

8. A process according to claim 1, wherein a pressure of approximately 30 bar is established in the hollow body during the cooling step.

9. A process according to claim 1, wherein, after cooling, a discharge is carried out against an operating air medium storage unit and/or a sound absorber.

10. A process according to claim 1, wherein the hollow body is cooled, at least temporarily, at an angular interval of approximately 200° to approximately 285° of a rotational stretch blowing machine via the hollow stretching rod.

11. A process according to claim 10, wherein the hollow body is cooled, at least temporarily, at an angular interval of approximately 240° to approximately 260° of a rotational stretch blowing machine via the hollow stretching rod.

12. A process according to claim 1, wherein the hollow body is cooled at a rotary angle of approximately 200° to approximately 285° of a rotational stretch blowing machine via the hollow stretching rod.

13. A process according to claim 12, wherein the hollow body is cooled at a rotary angle of approximately 240° to approximately 260° of a rotational stretch blowing machine via the hollow stretching rod.

14. A process according to claim 1, wherein the hollow body is cooled at a rotary angle of approximately 240° of a rotational stretch blowing machine.

15. A process according to claim 1, wherein the open bottom of the hollow stretching rod is positioned within the hollow body.

16. A process according to claim 1, wherein the open bottom of the hollow stretching rod is positioned adjacent to and configured to cool a base of the hollow body.

17. The process according to claim 1, further comprises at least one circulation passage extending through the blowing nozzle and defining a flow path remote from the hollow stretching rod to enable removal of the cooling medium from the hollow body during the cooling process.

18. A process for manufacturing a hollow body which is molded from a heated preform of thermoplastic material in a contoured blow mold, comprising stretching a preform by moving a hollow stretching rod through an opening of the preform and into a direction of its base, placing a blowing nozzle on the hollow body and connecting the blowing nozzle with a valve block comprising a preblowing valve, a final blowing valve, and further comprising subsequent steps of:

opening the preblowing valve and conducting preblowing air through the preblowing valve into the hollow body;

closing the preblowing valve, opening the final blowing valve and conducting final blowing medium through the opened final blowing valve into the hollow body; and closing the final blowing valve and cooling the hollow body by feeding a cooling medium through the hollow stretching rod, the hollow stretching rod having an open bottom directed downwardly and cooling the hollow body comprising cooling the base of the hollow body in a completely targeted manner by the cooling medium fed through the open bottom, and removing the cooling medium from the hollow body by means of the blowing nozzle thereby enabling circulation of the cooling medium during the cooling process, whereby the hollow body is blown in one of a plurality of blow molding stations which rotate on blow molding wheel and whereby process air is fed through ring channels to the one of plurality of blow molding stations.

* * * * *